United States Patent
Stafford et al.

(10) Patent No.: US 10,338,490 B1
(45) Date of Patent: Jul. 2, 2019

(54) PAPER SENSOR FOR ADJUSTING TRANSFER PARAMETERS

(71) Applicants: Kabushiki Kaisha Toshiba, Minato-ku (JP); Toshiba TEC Kabushiki Kaisha, Shinagawa-ku (JP)

(72) Inventors: Don W. Stafford, Lexington, KY (US); Michael W. Lawrence, Lexington, KY (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/903,387

(22) Filed: Feb. 23, 2018

(51) Int. Cl.
*G03G 15/02* (2006.01)
*G03G 15/00* (2006.01)
*G03G 15/01* (2006.01)

(52) U.S. Cl.
CPC ..... *G03G 15/0216* (2013.01); *G03G 15/0189* (2013.01); *G03G 15/5037* (2013.01); *G03G 15/607* (2013.01); *H04N 2201/0094* (2013.01)

(58) Field of Classification Search
CPC .................................................. G03G 15/607
See application file for complete search history.

(56) References Cited

U.S. PATENT DOCUMENTS

| | | | | |
|---|---|---|---|---|
| 2006/0201236 A1* | 9/2006 | Taira | ................... | G01N 33/346 73/73 |
| 2010/0067925 A1* | 3/2010 | Mori | ................... | G03G 15/235 399/15 |
| 2014/0086604 A1* | 3/2014 | Miyazaki | ........... | G03G 15/1605 399/45 |
| 2015/0168878 A1* | 6/2015 | Imaizumi | ........... | G03G 15/1605 399/405 |
| 2017/0153566 A1* | 6/2017 | Hashimoto | .......... | G03G 15/043 |

* cited by examiner

*Primary Examiner* — Clayton E. LaBalle
*Assistant Examiner* — Jas A Sanghera
(74) *Attorney, Agent, or Firm* — Ulmer & Berne LLP

(57) ABSTRACT

A system and method for adjusting transfer parameters in electrostatic-based printers includes a sensor proximate to a paper path before a toner transfer area. A sensor comprised of opposing conductive plates determines a paper property, such as its capacitance, as it passes through an air gap between the conductive plates. A transfer roller receives an electric charge for transferring toner from an associated transfer belt to the paper with a voltage of the electric charge being adjusted based on a transfer parameter corresponding to the sensor data.

16 Claims, 4 Drawing Sheets

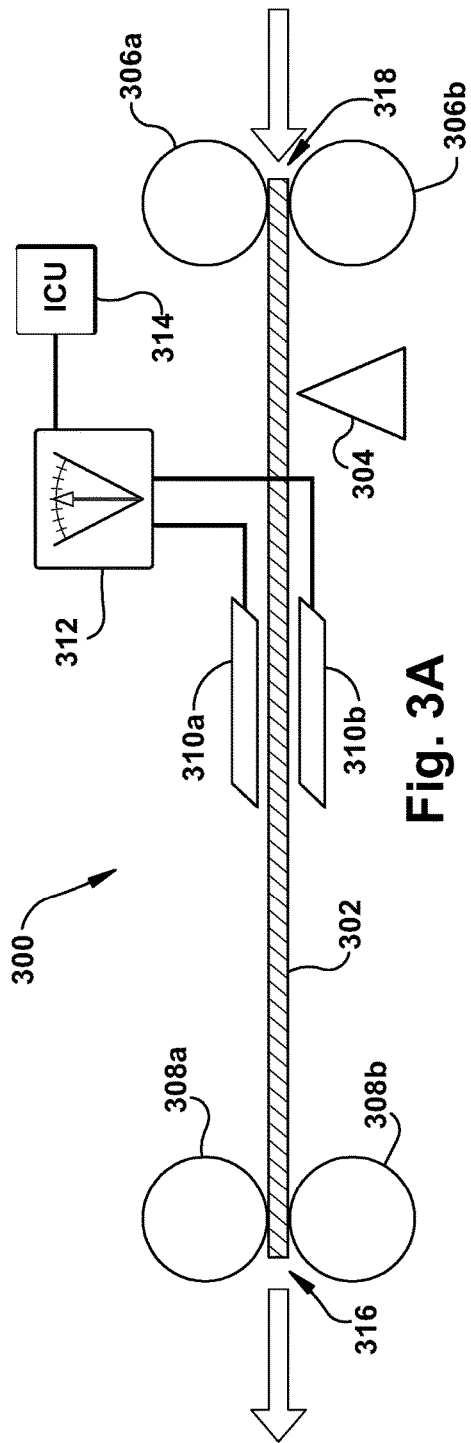
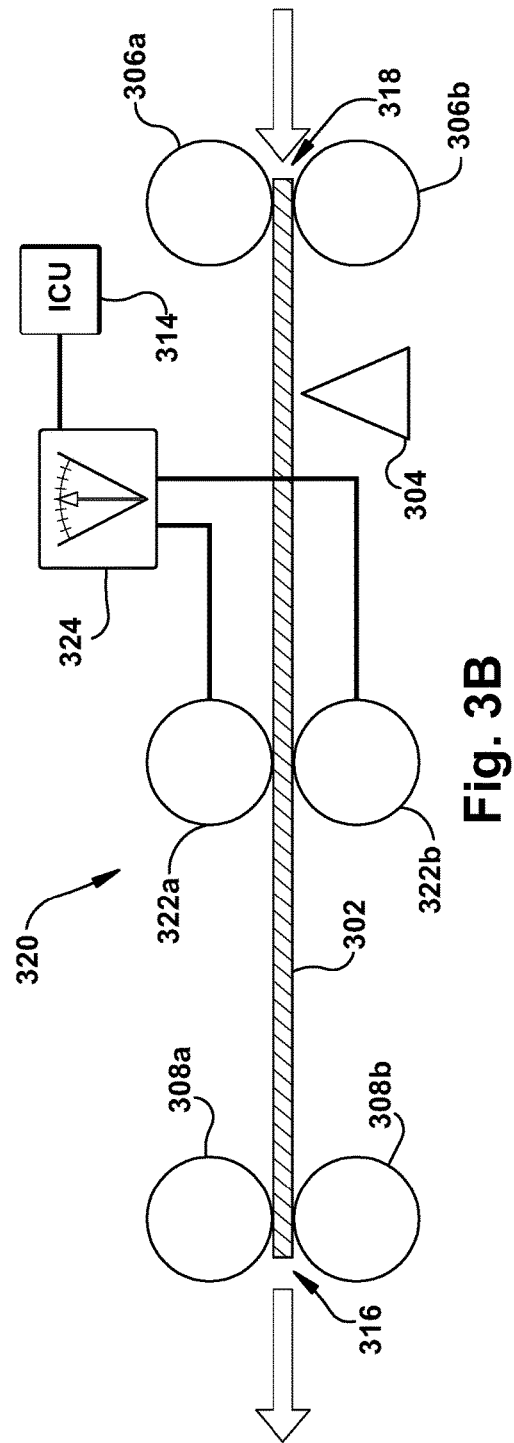

PAPER SENSOR FOR ADJUSTING TRANSFER PARAMETERS

TECHNICAL FIELD

This application relates generally to dynamically adjusting transfer parameters on electrostatic-based printers, and more particularly to a system that dynamically adjusts transfer voltages based on sensed dielectric and resistive properties of the paper used for printing a print job.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFP means any of the forgoing.

Toner-based print engines use magnetic and electric fields to move toner between the various parts of the print engine. Toner is selectively attracted from a developer roller onto photoconductive drums of an electrostatic process unit (EPU) in accordance with an image to be printed. The TBU transfers the toner from the photoconductive drums onto the paper. And the transferred toner is fused by heat onto the paper which is then delivered to a tray for retrieval by a user. MFPs utilize voltage potentials to transfer toner between the developer rollers, photoconductive drums, transfer belt unit (TBU), and paper.

However, the transfer of toner from the transfer belt onto paper can be affected by the paper's properties such as cellulose content, moisture content, additives such as whiteners, paper thickness, temperature, and so forth. Some MFPs include a manual adjustment for changing the transfer parameters, however the manual adjustment is rarely adjusted, and when the transfer voltage is adjusted that manual adjustment typically applies to all paper subsequently printed by the MFP.

BRIEF DESCRIPTION OF THE DRAWINGS

FIG. 3A is a diagram of an embodiment of a capacitance sensor for sensing paper properties;

FIG. 3B is a diagram of an embodiment of a resistance sensor for sensing paper properties.

SUMMARY

Figure 1:
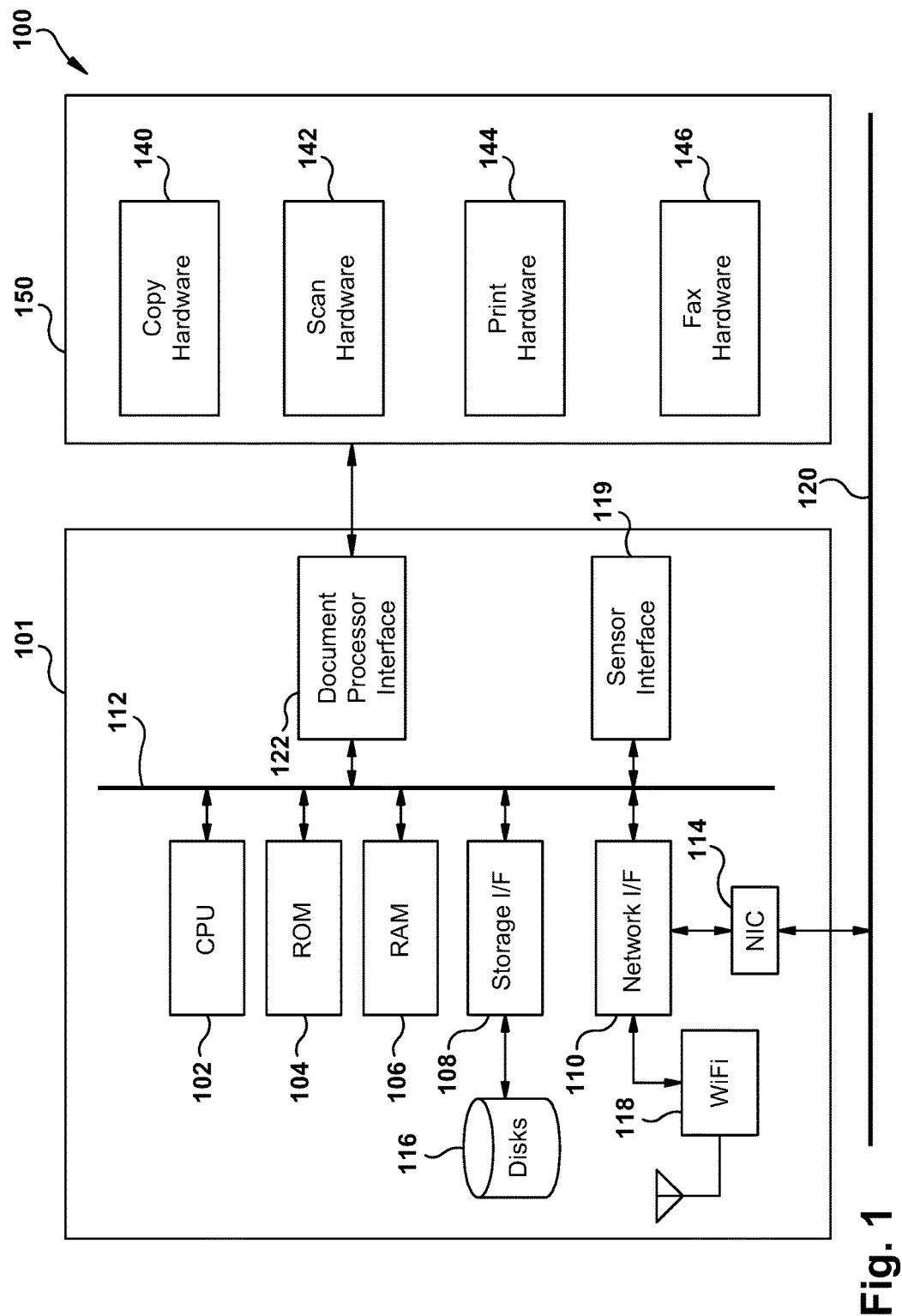
FIG. 1 is a block diagram of a multifunction peripheral.

A system and method for adjusting transfer parameters in electrostatic-based printers includes a sensor proximate to a paper path before a toner transfer area. Sensor data corresponding to at least one paper property in the paper path is generated. A transfer roller receives an electric charge for transferring toner from an associated transfer belt to the paper with a voltage of the electric charge being adjusted based on a transfer parameter corresponding to the sensor data.

In accordance with another aspect of the subject application, the paper property is its electrical capacitance. In accordance with another aspect of the subject application, the paper passes through an air gap between opposed, conductive plates. In accordance with another aspect of the subject application, the paper property is its electrical resistance. In accordance with another aspect of the subject application, the paper passes between conductive rollers that measure the electrical resistance of the paper.

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In toner-based electro-photographic printers, toner is picked up by a magnetic developer roller in an electrostatic process unit, or EPU, from a toner hopper. The magnetic developer roller rotates towards a photoconductive drum onto which an electric charge has been applied in accordance with a desired image to be printed, and toner from the magnetic developer roller is selectively transferred to the photoconductive drum. The toner is then transferred from the photoconductive drum to paper via a transfer belt and fused with the paper to form a printed page.

Printers and print engines utilize voltage potentials, or electric charges, to transfer toner between the developer rollers, photoconductive drums, transfer belt unit (TBU), and paper. However, the transfer of toner to the paper in particular can be affected by the paper properties such as cellulose content, moisture content, additives such as whiteners, paper thickness, temperature and so forth. For example, a suitable transfer voltage for a paper having a low moisture content can be substantially different than a suitable voltage for a paper having a high moisture content. Although some MFPs include a manual adjustment for changing the transfer parameters, the manual adjustment is rarely adjusted, and any adjustment would apply to all paper subsequently printed by the MFP. Example transfer parameters include the transfer voltage applied to a transfer roller, the speed at which a sheet of paper is fed between the transfer roller and the transfer belt, and any other suitable parameter that affects toner transfer and print quality.

Paper properties can change based on the type or brand of paper, or dynamically due to environmental influences. Paper from different manufacturers can have different cellulose content, additives such as whiteners, and different initial moisture content. Paper from the same manufacturer can vary from sheet to sheet. For example, when paper is made, the orientation of cellulose can vary depending upon whether the paper is cut from the center of a roll, where the cellulose fibers tend to be randomly oriented, or from the leading or trailing edges where cellulose fibers are more likely to be directionally oriented as a byproduct of the manufacturing processes. Paper that is initially placed into a paper tray from sealed packaging can have properties that change once the paper is exposed to the environment. For example, in high humidity environments paper that starts with an initial moisture content can absorb moisture from the environment and have a substantially higher moisture content by the time the paper is used for printing. Further, the top sheets of paper in a stack of paper will generally absorb more moisture than paper that is further down in the stack. The edges of paper in the stack will also generally absorb more moisture than the inner parts of the paper. Similarly, parts of the paper can be exposed to temperature fluctuations from the printer itself which can dry out the paper or otherwise change the paper properties. Paper that is reused or that has travelled through the fuser unit, such as a paper with two-sided printing, may be substantially dryer than paper coming out of a paper tray due to the heating of the paper during the fusing process.

With reference to FIG. 1, an example document rendering system 100 is presented. The document rendering system 100 includes electrostatic-based, or toner-based, printing hardware 102 for performing printing operations as would be understood in the art. Illustrated is an example embodiment of a document rendering system 100 suitably comprised within an MFP. Included is controller 101 comprised of one or more processors, such as that illustrated by processor 102. Each processor is suitably associated with non-volatile memory such as ROM 104, and random access memory (RAM) 106, via a data bus 112.

Processor 102 is also in data communication with a storage interface 108 for reading or writing to a storage 116, suitably comprised of a hard disk, optical disk, solid-state disk, cloud-based storage, or any other suitable data storage as will be appreciated by one of ordinary skill in the art.

Processor 102 is also in data communication with a network interface 110 which provides an interface to a network interface controller (NIC) 114, which in turn provides a data path to any suitable wired or physical network connection 120, or to a wireless data connection via wireless network interface 118. Example wireless connections include cellular, Wi-Fi, Bluetooth, NFC, wireless universal serial bus (wireless USB), satellite, and the like. Example wired interfaces include Ethernet, USB, IEEE 1394 (FireWire), Apple Lightning, telephone line, or the like.

Processor 102 can also be in data communication with any suitable user input/output (I/O) interface which provides data communication with user peripherals, such as displays, keyboards, mice, track balls, touch screens, or the like. Hardware monitors suitably provides device event data, working in concert with suitable monitoring systems, for example monitoring subroutines executed by the processor 102. By way of further example, monitoring systems may include page counters, sensor output, such as consumable level sensors, temperature sensors, power quality sensors, device error sensors, door open sensors, and the like. Sensor data can be obtained from the sensors via a sensor interface 119. Data is suitably stored in one or more device logs, such as in storage 116.

Also in data communication with data bus 112 is a document processor interface 122 suitable for data communication with MFP functional units. In the illustrated example, these units include copy hardware 140, scan hardware 142, print hardware 144 and fax hardware 146 which together comprise MFP functional hardware 150. It will be understood that functional units are suitably comprised of intelligent units, including any suitable hardware or software platform.

Figure 2:
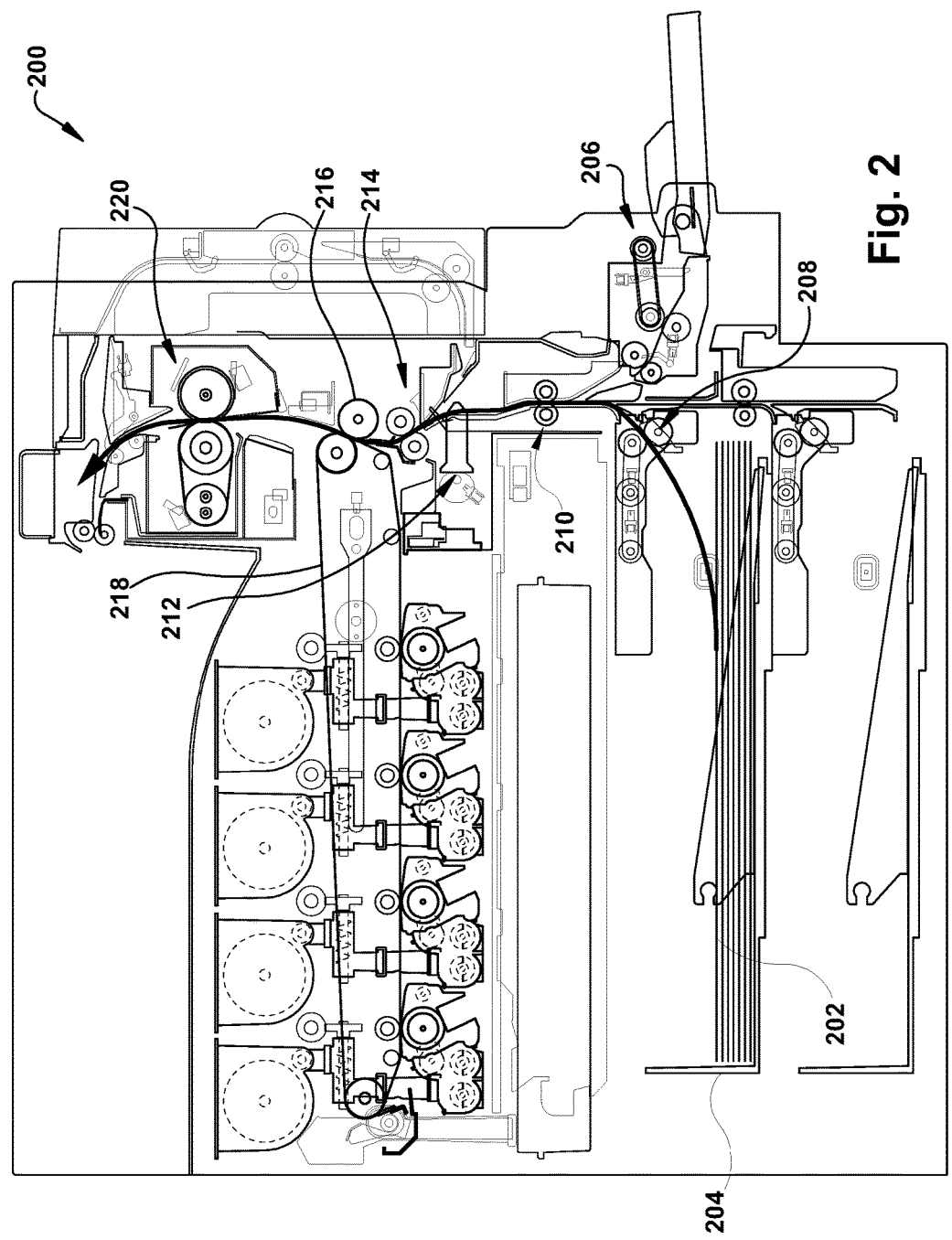
FIG. 2 is a diagram of the paper path for a multifunction peripheral.

With reference to FIG. 2, a cross sectional view of an MFP 200 is illustrated. The paper path illustrated by the arrowed line starts with a paper 202 being picked up by rollers 208 from a paper tray 204 as shown, or from a sheet bypass feed 206. The rollers 208 include a pickup roller, a feed roller, and a separation roller as would be understood in the art. A pair of transport rollers 210 receive the paper 202 and urge the paper 202 past a position detection sensor 212 to a pair of registration rollers 214. The position detection sensor 212 detects the leading edge of the paper 202 and the trailing edge of the paper 202 as the paper 202 moves between the transport rollers 210 and registration rollers 214. The registration rollers 214 urge the paper 202 into the nip between the transfer roller 216 and the transfer belt 218. The transfer roller 216 has an electrical charge that causes toner on the transfer belt 218 to transfer from the transfer belt 218 to the paper 202. The paper 202 enters the fuser 220 where the toner is fused to the paper by heat. The fuser 220 includes a fuser roller, fuser belt, and pressure roller as would be understood in the art.

With reference to FIGS. 3A and 3B, diagrams of embodiments of sensor units 300, 320 are illustrated. In FIGS. 3A and 3B, transport rollers 306a and 306b (collectively transport rollers 306) urge a paper 302 past a registration sensor 304 to registration rollers 308a and 308b (collectively registration rollers 308). The registration sensor 304 can be configured to sense the beginning edge 316 of the paper 302 and the trailing edge 318 of the paper 302.

In FIG. 3A, a paper capacitance sensor unit 300 includes conductive plates 310a and 310b (collectively conductive plates 310) and capacitance sensor 312. As the paper 302 moves between the conductive plates 310, the capacitance sensor 312 determines the capacitance of the paper 302 and air gap between the conductive plates 310. The output of capacitance sensor 312 can be monitored by a suitable processor such as the intelligent controller 314 of the MFP to determine, or estimate, the dielectric properties of the paper 302. An increase of the dielectric property of the paper 302 can be correlated to an increase in moisture content or other properties of the paper 302 that can affect toner transfer. Although the paper capacitance sensor unit 300 is illustrated using conductive plates 310, other structures can be used to measure capacitance as would be understood in the art, including but not limited to existing structures and sensors of the MFP.

In FIG. 3B, a paper resistance sensor unit 320 includes conductive rollers 322a and 322b (collectively conductive rollers 322) and resistance sensor 324. As the paper 302 moves between the conductive rollers 322, the resistance sensor 324 determines the conductivity of the paper 302. The output of resistance sensor 324 can be monitored by a suitable processor such as the intelligent controller 314 of the MFP to determine a resistance property of the paper 302. Paper 302 is generally an insulator with a resistance that is typically in the gigaohm range. A decrease in resistance of the paper 302 can be correlated to an increase in moisture content or other properties of the paper 302 that can affect toner transfer. Although the paper resistance sensor unit 300 is illustrated using conductive rollers 322, other structures can be used to measure capacitance as would be understood in the art, including but not limited to contact strips, existing structures such as the transport rollers 306 or registration rollers 308, and other sensors of the MFP.

The intelligent controller 314 can determine one or more transfer parameters to be used during printing based on the capacitance, the resistance, the temperature, or any other measurements or estimates of the paper. The transfer parameter can be computed by the intelligent controller 314 by lookup table or by a suitable calculation. For example, a transfer parameter can include the voltage applied to the transfer roller for transferring toner from the transfer belt to the paper. The transfer parameter can be a single value for the entire sheet of paper, or two values that might be used for example for printing the first side of a sheet of paper using a first value and the second side of a sheet of paper using a second value. The transfer value can also be a function that varies based on time or paper position, or any other suitable range of values.

Although the sensor units 300, 320 are described and illustrated as being positioned between the transport rollers 306 and registration rollers 308, the sensor units 300, 320 can be located at any suitable position prior to the paper 302 entering the toner transfer area between the transfer roller (not shown, see transfer roller 216 of FIG. 2) and transfer belt (not shown, see transfer belt 218 of FIG. 2) after which toner has been transferred to the paper 302.

In a first embodiment, the transfer parameter is use to adjust the transfer voltage applied to the transfer roller. For example, the transfer voltage can be raised or lowered to improve the transfer of toner to the paper 302 from the transfer belt based on the determined paper properties. For example, a higher transfer voltage can be used on the transfer roller for paper 302 with higher moisture content. Example transfer voltages can range from approximately 500 Volts to approximately 3000 Volts, but are typically in the range of 1000 Volts to 2000 Volts to ensure sufficient voltage to transfer toner without creating an overdrive situation which can substantially degrade performance. Based on the determined transfer parameter, the transfer voltage can be adjusted by approximately plus or minus 1000 Volts to improve toner transfer from the transfer belt to the paper 302. For example, a nominal bias voltage of approximately 1500 Volts can be used which is adjusted upwards or downwards.

In a second embodiment, the transfer parameter is used to adjust the temperature used by the fuser (not shown, see fuser 220 of FIG. 2). For example, paper 302 with higher moisture content can require a higher temperature at the fuser to remove moisture from the paper 302 and ensure that the toner adheres properly to the paper 302.

In a third embodiment, the transfer parameter can be used to adjust the speed of the paper 302 as the paper 302 travels across the transfer roller or fuser. For example, paper 302 that has a higher moisture content may require additional time in the fuser, compared to dryer paper 302, to eliminate moisture in the paper 302 and raise the temperature of the paper 302 and toner sufficient to properly fuse the toner to the paper 302. For example, it may not be practical to raise or lower the temperature used by the fuser, especially to adjust for different transfer parameters on a sheet by sheet basis during a print job. In this embodiment, the speed can be adjusted to compensate for the properties of the paper 302 without requiring changes to the fuser temperature.

In a fourth embodiment, the paper 302 can have different paper properties depending upon prior print operations performed on the same piece of paper 302. For example, a sheet of paper 302 used for a two-sided print job can have substantially different paper properties depending upon whether it is the first side or the second side of the paper 302 that is being printed. When the second side of the paper 302 is printed, the paper 302 has already passed through the fuser once for the first side. When first side of the paper 302 is printed, the fuser heats the paper 302 which also dries the paper 302. Both temperature and moisture content can affect the transfer properties. When the paper 302 is redirected back to the transfer roller and fuser the second time, the sensor units 300, 320 can detect and update the transfer parameters based on measured changes to the paper 302. In a configuration, the intelligent controller 314 can estimate an adjustment to the transfer parameters based on whether the first side of the sheet of paper 302 or the second side of the paper 302 is being printed.

In a fifth embodiment, the transfer parameters can be adjusted based on an average computed by the intelligent controller 314. The average can be based on the sensed paper properties for a number of papers 302. For example, an estimate for a stack of paper 302 in a paper tray can be computed based on the first several sheets of paper 302 and then used for the rest of the paper 302 in the paper tray. The average can be recomputed each time the paper tray is opened, as that can be an indication that new paper 302 is added to the paper tray. In another example, the average can be computed based on a moving window, for example an estimate based on measurements from the last ten sheets of paper 302.

In a sixth embodiment, the transfer parameters can be adjusted intra-page for a single piece of paper 302. The properties of the paper 302 can be sensed along the entire length of the paper 302 from the leading edge 316 to the trailing edge 318 as the paper 302 passes across one or more sensor units 300, 320. The transfer voltage applied to the transfer roller can be dynamically adjusted in real time to compensate for the changes in the paper 302. For example, because the leading edge 316 and the trailing edge 318 of the paper 202 tend to be more exposed to the environment than the inner portions of the paper 302, the leading edge 316 and trailing edge 318 can have higher moisture content than other parts of the paper 302. The transfer voltage can be dynamically raised and lowered as necessary to reflect intra-page changes across the length of the paper 302. In a configuration, the paper parameter sensor units 300, 320 can be configured to additionally sense differences in properties across the width of the paper 302. In this configuration, the intelligent controller 314 can estimate a suitable transfer parameter for the paper 302 to optimize toner transfer that takes into account local differences in properties of the paper 302. In a configuration, if the fuser supports multiple different heating zones, the different heating zones can be configured based on the difference in properties across the width of the paper.

Figure 4:
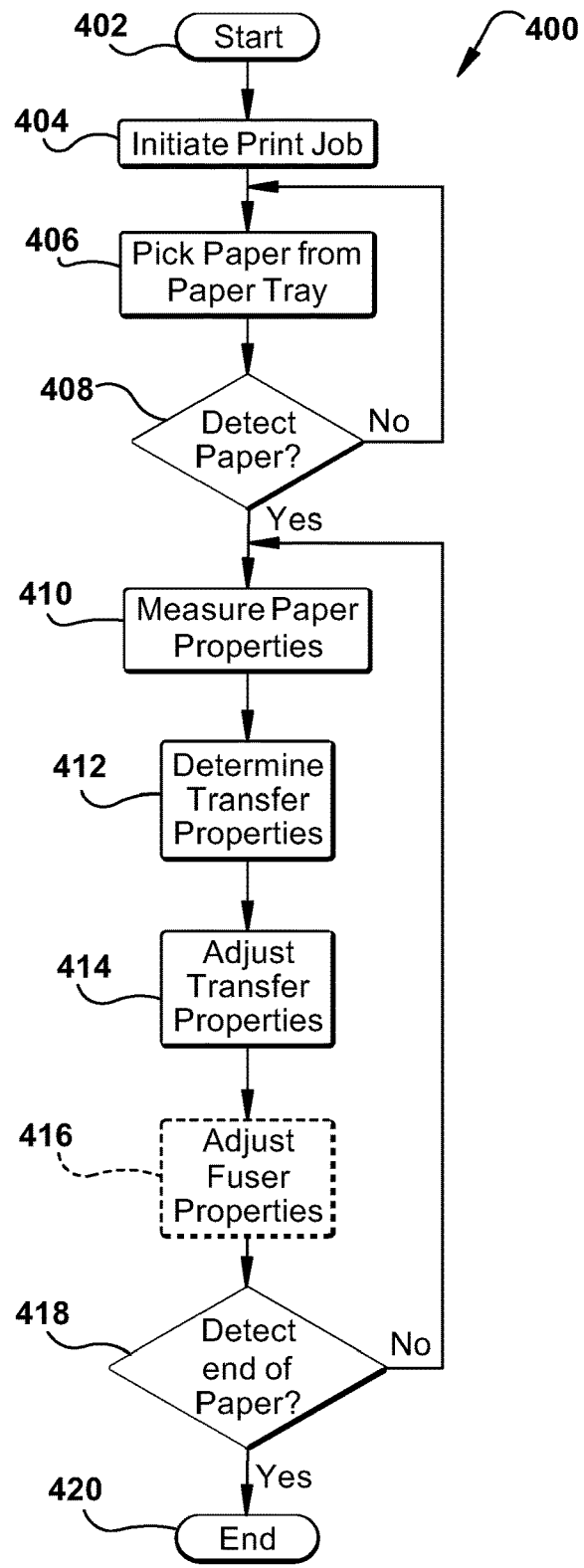
FIG. 4 is a flowchart of example operations of an embodiment of a system for adjusting transfer parameters based on sensed paper properties.

With reference to FIG. 4, an example flowchart 400 illustrates example operations of a system for dynamically adjusting transfer properties. The process begins at start block 402 and proceeds to block 404 when a print job is initiated in a print engine of an MFP.

Progress proceeds to block 406 where the paper to be used for the print job is picked from a paper tray or received from the sheet bypass feed. At block 408, if paper is not detected at the registration sensor then progress returns to 406. When paper is detected by the registration sensor at block 408, then progress is made to block 410 where the properties of the paper are sensed, for example using a capacitance sensor, a resistance sensor, a temperature sensor, or any combination of sensors.

Progress proceeds to block 412 where a processor, such as the intelligent controller of a MFP, determines adjustments to the transfer parameters based on the sensor measurements of block 408. In a configuration, the processor can also use estimates or averages from previous sensor measurements to adjust the transfer parameters. For example, if a paper is being printed on both sides, the processor can determine a different set of transfer parameters for the second side because the paper has already been through the fuser when the first side was printed. In another example, the processor can use average sensor readings over multiple sheets to set the transfer parameters.

As the paper moves through the registration rollers into the transfer area between the transfer belt and transfer roller, the processor adjusts the transfer properties of the transfer roller at block 412, for example by raising or lowering the transfer voltage applied to the transfer roller as described above in greater detail. At optional block 416, the fuser properties can be adjusted, for example by raising or lowering the temperature of the fuser roller and fuser belt, or by slowing the rate of travel of the paper as described above. At block 418, if the registration sensor senses the trailing edge of the paper, the processor waits until the paper has passed through the transfer area and fuser after which processing terminates at end block 420. If at block 418 the registration sensor continues to sense paper, then processing returns to block 410 and additional measurements of the paper can be made. By looping back to block 410, the flowchart 400 is intended to show that paper properties can be monitored and transfer parameters can be adjusted substantially continuously.

In light of the foregoing, it should be appreciated that the present disclosure significantly advances the art of toner transfer from a transfer belt to paper. While example embodiments of the disclosure have been disclosed in detail herein, it should be appreciated that the disclosure is not limited thereto or thereby inasmuch as variations on the disclosure herein will be readily appreciated by those of ordinary skill in the art. The scope of the application shall be appreciated from the claims that follow.

What is claimed is:

1. An apparatus, comprising:
a sensor positioned in proximity to a paper path before a toner transfer area of a toner-based print engine, and configured to generate sensor data corresponding to at least one property of a paper in the paper path;
a transfer roller configured to receive an electric charge for transferring toner from an associated transfer belt to the paper,
wherein a voltage of the electric charge is adjusted based on a transfer parameter corresponding, at least in part, to the sensor data, and
wherein a speed of the transfer roller varies based on the transfer parameter; and
a processor configured to receive the sensor data from the sensor and determine the transfer parameter based at least in part on the received sensor data,
wherein the processor is further configured to determine the transfer parameter based on
sensor data from a temperature sensor,
sensor data from a humidity sensor,
an average of a plurality of sensor data,
a moving average of a plurality of sensor data,
an estimated paper property based on
a cellulose content of the paper,
an initial moisture content of the paper,
an additive content of the paper, and
a thickness of the paper, and
an estimated paper property based on a condition selected from the group consisting of a print operation to a first side of the paper, and a print operation to a second side of the paper subsequent to the print operation to the first side of the paper.

2. The apparatus of claim 1, wherein the processor is further configured to adjust the transfer voltage applied to the transfer roller in accordance with the determined transfer parameter.

3. An apparatus comprising:
a sensor positioned in proximity to a paper path before a toner transfer area of a toner-based print engine, and configured to generate sensor data corresponding to a least one property of a paper in the paper path, wherein the property of the paper is an electrical capacitance of the paper; and
a transfer roller configured to receive an electric charge for transferring toner from an associated transfer belt to the paper,
wherein a voltage of the electric charge is adjusted based on a transfer parameter corresponding, at least in part, to the sensor data, and
wherein a speed of the transfer roller varies based on the transfer parameter.

4. The apparatus of claim 3, wherein the sensor further comprises:
a plurality of conductive plates disposed so as to have an air gap therebetween through which the paper can be passed.

5. The apparatus of claim 3, wherein the sensor is disposed between a pair of transport rollers and a pair of registration rollers of the toner-based print engine.

6. The apparatus of claim 5, further comprising:
a multifunction peripheral including
an intelligent controller comprising a processor and an associated memory, and
a print engine comprising
the sensor,
the transfer roller,
a transfer belt unit including the transfer belt,
one or more electrostatic process units in communication with the transfer belt, and
a fuser configured to fuse the toner onto the paper.

7. The apparatus of claim 3, further comprising:
a registration sensor in proximity to the paper path and configured to sense a leading edge of the paper, a presence of the paper in the paper path, and a trailing edge of the paper.

8. An apparatus comprising:
a sensor positioned in proximity to a paper path before a toner transfer area of a toner-based print engine, and configured to generate sensor data corresponding to at least one property of a paper in the paper path, wherein the property of the paper is an electrical resistance of the paper; and
a transfer roller configured to receive an electric charge for transferring toner from an associated transfer belt on the paper,
wherein a voltage of the electric charge is adjusted based on a transfer parameter corresponding, at least in part, to the sensor data, and
wherein a speed of the transfer roller varies based on the transfer parameter.

9. The apparatus of claim 8, wherein the sensor further comprises:
a plurality of conductive rollers between which the paper can be passed.

10. A multifunction printer comprising:
an intelligent controller comprising a processor and associated memory;
a print engine operable to perform a print operation in accordance with instructions from the intelligent controller; and
a sensor disposed in a paper path leading into a toner transfer area of the print engine, the sensor configured to generate sensor data corresponding to at least one property of a paper in proximity to the sensor during the print operation, wherein the processor is configured to receive the sensor data from the sensor, determine a transfer parameter based at least in part on the sensor data, adjust a voltage applied to a transfer roller of the print engine in accordance with the transfer parameter, and adjust a speed of paper in the paper path based at least in part on the sensor data, wherein the property of the paper is an electrical capacitance of the paper, and wherein the sensor further comprises:

a plurality of conductive plates disposed so as to have an air gap therebetween through which the paper can be passed.

11. The multifunction printer of claim 10, wherein the sensor is disposed between a pair of transport rollers and a pair of registration rollers of the print engine, and further comprising:

a registration sensor in proximity to the paper path and configured to sense a leading edge of the paper, a presence of the paper in the paper path, and a trailing edge of the paper, wherein the processor is further configured to determine a plurality of transfer parameters associated with paper, and wherein the voltage applied to the transfer roller in accordance with the plurality of transfer parameters is dynamically adjusted between the leading edge of the paper and the trailing edge of the paper.

12. The multifunction printer of claim 10, wherein the processor is further configured to determine the transfer parameter based on one or more of sensor data from a temperature sensor, sensor data from a humidity sensor, an average of a plurality of sensor data, a moving average of a plurality of sensor data, an estimated paper property based on one or more of a cellulose content of the paper, an initial moisture content of the paper, an additive content of the paper, and a thickness of the paper, and an estimated paper property based on a condition selected from the group consisting of a print operation to a first side of the paper, and a print operation to a second side of the paper subsequent to the print operation to the first side of the paper.

13. A multifunction printer comprising:

an intelligent controller comprising a processor and associated memory;

a print engine operable to perform a print operation in accordance with instructions from the intelligent controller; and a sensor disposed in a paper path leading into a toner transfer area of the print engine, the sensor configured to generate sensor data corresponding to at least one property of a paper in proximity to the sensor during the print operation, wherein the processor is configured to receive the sensor data from the sensor, determine a transfer parameter based at least in part on the sensor data, adjust a voltage applied to a transfer roller of the print engine in accordance with the transfer parameter, and adjust a speed of paper in the paper path based at least in part on the sensor data, wherein the property of the paper is an electrical resistance of the paper, and wherein the sensor further comprises:

a plurality of conductive rollers between which the paper can be passed.

14. A method comprising:

sensing, by a sensor disposed in a paper path leading into a toner transfer area of a print engine, a property of a paper in proximity to the sensor;

generating sensor data correlating to the sensed property;

determining, by a processor associated with the point engine, one or more voltage adjustments to apply to a transfer roller of the print engine to improve toner transfer to the paper based at least in part on the sensor data;

determining, by the processor, a speed of paper through the print engine to improve transfer to the paper based at least in part on the sensor data; and wherein the sensor comprises a pair of conductive plates disposed on either side of the paper path and separated by an air gap, and wherein the operation of sensing comprises sensing an electrical capacitance of the paper and the air gap when the paper is between the conductive plates.

15. The method of claim 14, wherein each voltage adjustment is selected from a range between approximately −1000 Volts and approximately +1000 Volts, and wherein the total voltage applied to the transfer roller is between approximately 500 Volts and approximately 3000 Volts.

16. A method comprising:

sensing, by a sensor disposed in a paper path leading into a toner transfer area of a print engine, a property of a paper in proximity to the sensor;

generating sensor data correlating to the sensed property;

determining, by a processor associated with the point engine, one or more voltage adjustments to apply to a transfer roller of the print engine to improve toner transfer to the paper based at least in part on the sensor data;

determining, by the processor, a speed of paper through the print engine to improve transfer to the paper based at least in part on the sensor data; and wherein the sensor comprises a pair of conductive rollers configured to contact the paper in the paper path, and wherein the operation of sensing comprises sensing, substantially, an electrical resistance of the paper between the conductive rollers.

* * * * *